United States Patent [19]

Turro

[11] 4,448,657

[45] May 15, 1984

[54] METHODS EMPLOYING MAGNETIC FIELDS FOR CONTROLLING EMULSION POLYMERIZATION

[75] Inventor: Nicholas J. Turro, Tenafly, N.J.

[73] Assignee: The Trustees of Columbia University in the City of New York, New York, N.Y.

[21] Appl. No.: 314,664

[22] Filed: Oct. 23, 1981

[51] Int. Cl.$^3$ .......................... C08F 2/50; C03G 19/00
[52] U.S. Cl. ................................ 204/155; 204/159.23; 526/88; 526/317; 430/39; 430/281
[58] Field of Search ........................... 526/88; 204/155

[56] References Cited

U.S. PATENT DOCUMENTS

| | | | |
|---|---|---|---|
| 2,352,791 | 7/1944 | Krumboltz | 204/155 |
| 3,774,885 | 11/1973 | Logvinenko et al. | 526/88 |
| 4,282,304 | 8/1981 | Bayley | 526/88 |
| 4,338,169 | 7/1982 | Bienvenu | 204/155 |

FOREIGN PATENT DOCUMENTS 1025234  4/1966  United Kingdom ................ 204/155

OTHER PUBLICATIONS

Turro et al., "Stereochemistry . . . ", J. Polym. Sci., Polym. Chem. Ed., V21 (4), pp. 1085–1096, 1983.
Turro et al., "Magnetic . . . ", J. Am. Chem. Soc., V105 (6), pp. 1572–1577, 1983.
Chung, "Magnetic Field . . . ", Diss. Abstr. Int. B 1982, 43(5), 1492, Univ. Microfilms Int., Order No. DA8222366.
Calvert et al., "Photochemistry", Wiley 1966, pp. 289, 290.
Kosar, "Light Sensitive Systems", Wiley 1965, pp. 170, 173, 177.
Buchachenko, "Enrichment of Magnetic Isotopes . . . New Method of Investigation of Chemical Reaction Mechanism", Russ. J. Phy. Chem., vol. 51, No. 10, pp. 1445–1451, (1977).
Turro et al., "Magnetic Isotope & Magnetic Field Effects . . . $^{13}$C & $^{12}$C Isotopes", J. Am. Chem. Soc., vol. 100, pp. 7432–7434, (1978).
"Photolysis Produces Isotope Enrichment", Nov. 13, 1978, C&EN 23.
Maugh II, "A New Way to Separate Isotopes", Science vol. 206, p. 317, Oct. 19, 1979.
Turro et al., "An Efficient, High Conversion Photoinduced . . . Polymer Molecular Weight", J. Am. Chem. Soc., vol. 102, pp. 7391–7393, (Nov. 1980).
Sagdeev et al., "The Influence of the Magnetic Field . . . Molecules in Solutions", Russian Chemical Reviews, vol. 46, pp. 569–601, (1977).
Turro et al., "Magnetic Field & Magnetic Isotope . . . Micellar Solutions", J. Am. Chem. Soc., vol. 102, pp. 4843–4845, (Jul. 1980).

Primary Examiner—John C. Bleutge
Assistant Examiner—A. H. Koeckert
Attorney, Agent, or Firm—Shapiro and Shapiro

[57] ABSTRACT

Emulsion polymerization with initiators that produce triplet radical pairs is controlled by the application of a magnetic field. Both the rate of polymerization and the molecular weight of the polymer can be controlled. Emulsion polymerization with oil-soluble initiators is enabled to proceed to high conversions at convenient rates and to produce polymers having molecular weights comparable to or higher than those achievable with conventional water-soluble initiators.

9 Claims, No Drawings

METHODS EMPLOYING MAGNETIC FIELDS FOR CONTROLLING EMULSION POLYMERIZATION

The Government has rights in this invention pursuant to Grant Number 81-83-CHE 78-00692 awarded by the National Science Foundation.

BACKGROUND OF THE INVENTION

This invention relates generally to novel methods employing magnetic fields for controlling chemical reactions initiated by free radicals, such as emulsion polymerization, and more particularly, for improving the efficiency and yield of such reactions.

Emulsion polymerization is commonly employed to produce high molecular weight polymers at relatively rapid rates. An emulsion polymerization typically involves four fundamental ingredients: (1) an aqueous dispersion medium; (2) dispersed droplets of monomer; (3) an emulsifier such as a micelle-generating detergent; and (4) an initiator.

An explanation of the conventional mechanism of emulsion polymerization is provided by the Smith-Ewart theory (see Smith, W. V. and Ewart, R. W., *J. Chem. Phys.*, 1948, Vol. 16, p. 592). According to this theory, there are three stages of emulsion polymerization. In the initial stage the loci of initiation of polymerization are micelles (aggregates of large numbers, e.g., 50-100, of detergent molecules) swollen with monomer molecules. During this stage, dispersed monomer droplets serve as a reservoir of monomer molecules, and "nuclei" of growing polymer particles are produced in the micelles. Toward the end of this stage (10-20% conversion of monomer), the number and size of growing polymer particles increase and the number of micelles decreases because detergent molecules become preferentially adsorbed on growing polymer particles which swell with monomer that is available from the dispersed droplet reservoir. In the second stage, the major growth of polymer occurs as the volume of monomer swollen polymer particles increases and the volume of monomer reservoir decreases. During this stage, the loci of polymerization are considered to be exclusively the polymer particles. In the final stage the monomer disappears completely and the unreacted monomer exists only in swollen polymer particles.

The Smith-Ewart theory provides a satisfactory framework for explaining the exceptional features of emulsion polymerization, i.e., the simultaneous achievement of a high molecular weight polymer and a high polymerization rate result from the generation of a large number of isolated microscopic reaction vessels (in the first stage) that allow for the uninterrupted propagation of polymerization in the absence of chain transfer or termination. Emulsion polymerizations use water-soluble initiators, which allow termination to be minimized since initiation will involve a single radical which is delivered from the aqueous phase to a monomer-swollen micelle or to a monomer-swollen polymer particle. Oil-soluble initiators are generally ineffective in emulsion polymerization, because such initiators produce pairs of radicals in the polymerization loci which recombine rapidly, thereby favoring termination before substantial polymer growth can occur.

If oil-soluble initiators (many of which are available and some of which are cheaper than water-soluble initiators) could be employed effectively for emulsion polymerization, a wider variety of polymers could be manufactured. The invention accomplishes this and other advantageous results by employing a mechanism that produces long-lived radical pairs and that substantially enhances the efficiency of escape of radicals from such radical pairs by controlling the rate at which radical combination occurs. This enables one of the radicals of a radical pair produced by an oil-soluble initiator to escape into the aqueous phase at a rate that is faster than either the rate at which the monomer is attacked or the rate at which radical combination occurs, thereby providing a situation that is analogous to that which exists with water-soluble initiators.

BRIEF SUMMARY OF THE INVENTION

The invention provides methods of controlling an emulsion polymerization which include employing an initiator that produces triplet radical pairs for initiating polymerization, and the application of magnetic fields which affect the triplet radical pairs. The concepts of the invention involve both the interaction of magnetic fields on germinate radical pairs and the reduced dimensionality for reaction provided by chemical systems such as emulsion polymerizations.

As used herein, the term "restricted dimensionality" connotes an environment in which the degree of freedom of translational motion of a molecule (or molecular fragment) is significantly reduced relative to that which exists in a homogeneous, isotropic fluid solution. For example, restrictions are placed on the distance an organic molecule (or organic molecular fragment) may translate from a given point when the molecule is sequestered in a micelle as in emulsion polymerization. Although the interior of a micelle provides a medium that resembles a homogeneous, isotropic fluid solution, the highly polar interface that separates the hydrophobic and hydrophilic portions of the micelle is a reflecting boundary for organic species. This restricts the translational motion of the organic species to regions of space inside the micelle. The micelle as a whole constitutes a containment structure of restricted dimensionality for reaction. In the initial stages of polymerization, the growing polymer particles also provide an environment of restricted dimensionality. Gels may also be employed and are another example of an environment that provides restricted dimensionality.

In homogeneous solutions, conditions are not suitable for significant magnetic field effects on free radical formation because triplet radical pairs generally form free radicals in quantitative yield, i.e., there is no cage combination. In micelle-forming detergent (surfactant) solutions, however, triplet radical pairs are generated and confined within micelles. The reduced dimensionality (at a molecular level) of a micelle relative to a homogeneous, isotropic solution has a pronounced effect on the extent of cage combination and the response of the triplet radical pairs to weak external magnetic fields.

The mechanism of the invention involves the splitting by a magnetic field of the $T_+$ and $T_-$ sublevels of a triplet radical pair from the singlet (S) level. This splitting inhibits the intersystem crossing of the $T_+$ and $T_-$ triplet sublevels to the singlet radical pair. Since only singlet radical pairs undergo cage recombination reactions, the combination process of a triplet radical pair is thereby inhibited by the application of the magnetic field. This allows the inhibited triplet sublevels to undergo more efficient free radical formation. A more efficient escape of radicals simultaneously allows a more efficient initiation of polymerization and the formation of a greater number of polymer particles (by reducing the extent of radical pair combination in micelles), a more efficient overall initiation (by escaping radicals which enter other micelles), and a less efficient termination (by inhibiting the extent of combination of propagating radicals and initiator radicals). The magnetic field may be selected to provide a desired rate of intersystem crossing, as explained hereinafter, and it serves somewhat like a switch to increase the concentration of free radicals. As a result, the invention enables control of the rate of polymerization and the structural properties, e.g., molecular weight, of the polymer.

DETAILED DESCRIPTION

Photo-induced emulsion polymerization is an important class of emulsion polymerizations to which the invention pertains, and the following examples describe the invention in that context. However, as will be apparent, the invention has broader utility. For example, the invention is also applicable to emulsion polymerizations employing initiators which produce triplet radical pairs under the influence of electromagnetic radiation other than light or under the influence of heat.

EXAMPLE I

Emulsion Polymerization of Styrene Initiated By Dibenzyl Ketone (DBK), Benzoin (BZ), β-Ketoglutaric Acid (KGA), and Sodium Persulfate (SP)

A series of polymerizations was effected by irradiating (313 nm isolated with a $K_2CrCO_4$ filter Pyrex vessel, 450-W medium-pressure cylindrical immersion-type Hg lamp) aqueous systems containing 2–3 ml of dispersed styrene (Sty), b 1–2 % sodium dodecyl sulfate (SDS), 0.05–0.06% initiator, and 5–6 ml of water. Experiments were performed using oil-soluble photoinitiators dibenzyl ketone (DBK) and benzoin (BZ), and using aqueous soluble photoinitiator β-ketoglutaric acid (KGA) and aqueous thermal initiator sodium persulfate (SP). Experiments were also performed using DBK, BZ and KGA without SDS. The solutions were stirred vigorously with a magnetic stirring bar that was driven by a magnetic stirrer. The magnetic field generated in the proximity of the sample by the bar and the stirring magnet was of the order of 150 Gauss. Polymer was precipitated by addition of reacted solutions to methanol. In each case, the percent yield of dried polymer and its average molecular weight ($M_r$) were determined. The results are given in the following Table 1,

TABLE 1

| Molecular Weight and Yield of Emulsion Polymer | | | |
|---|---|---|---|
| initiator | $M_r$ | % yield | polymerization time, h |
| DBK | $4.6 \times 10^6$ | 82 | 6 |
| DBK* | $4.6 \times 10^4$ | 5 | 20 |
| BZ | $5.5 \times 10^6$ | 75 | 4 |
| BZ* | $6.0 \times 10^4$ | 4 | 4 |
| KGA | $8.8 \times 10^6$ | 80 | 8 |
| KGA* | $1.3 \times 10^6$ | 1 | 8 |
| SP** | $1.3 \times 10^6$ | 85 | 10 |

*without SDS
**The initial solution contained 1% SDS, 0.067% SP, and 2 ml of styrene in 12 ml of water. The polymerization was carried out at 65° C.

From the data in Table 1, it is apparent that the photochemical initiation of polymerization by dibenzyl ketone (DBK) and benzoin (BZ) in a micelle environment of restricted dimensionality and in the presence of a magnetic field can be carried to conversions that are comparable to those achieved with conventional aqueous soluble thermal initiators, and can achieve molecular weights (approximately $5 \times 10^6$ g) which are comparable to or higher than those achievable with conventional aqueous soluble thermal initiators. The intensity of photoexcitation was found to influence both the rate of conversion to polymer and the polymer's average molecular weight. Higher intensities produce lower average molecular weights. Remarkably, when the agitation method involved an air-driven stirrer, the rate of conversion of polymer and the average molecular weight of the polymer decreased dramatically.

Next, with DBK as the photoinitiator, the average polymer molecular weight ($M_r$) and the rate of polymerization as a function of magnetic field strength were determined by conducting a series of polymerizations in magnetic fields of different strengths. These experiments employed solutions containing 4% SDS, 0.047% DBK, and 1 ml of styrene in 5 ml of water. The solution was placed in a 2 cm. diameter Pyrex tube which was stirred with an air-driven glass stirrer. The excitation light (313 nm, as above, provided by a high-pressure Hg lamp operated at approximately 450 W) was focused onto approximately a 1.5 cm. diameter area of the Pyrex tube. The solution was argon purged to remove oxygen by bubbling argon through the solution for at least 30 minutes at room temperature. The sample tube was placed between the poles of an Alpha Model 4600 electromagnet, and the magnetic field strength at the sample was adjusted to a preselected value. Experiments were conducted using different magnetic field strengths from approximately 0 to 10,000 Gauss.

For magnetic field strengths less than approximately 500 Gauss, the $M_r$ of the isolated polymer was found to increase (approximately linearly) by a factor of 5 with increasing field strength. Between about 500–1000 Gauss, the rate of increase of $M_r$ with field strength decreased monotonically and $M_r$ approached a constant value at approximately 1000 Gauss. Between 1000–10,000 gauss, $M_r$ remained approximately constant. The yield of polymer for comparable periods of irradiation was also found to vary with magnetic field strength in a manner qualitatively the same as the molecular weight. It was found that the $M_r$ of polymer produced by neither the aqueous soluble photoinitiator β-ketoglutaric acid (KGA) nor the aqueous thermal initiator sodium persulfate (SP) varied with the application of an external magnetic field. However, with DBK and BZ oil-soluble photoinitiators, weak magnetic fields, e.g., 1000 Gauss or less, were found to significantly affect both the rate of polymerization and the molecular weight of the resulting polymer, and such magnetic fields can be used for controlling polymerization.

EXAMPLE II

Emulsion Polymerization of Styrene Initiated By Triplet Sensitized Photolysis of 1,1′-Azoethane (DPAE)

Experiment in the Absence of an External Magnetic Field:

Five ml of 0.15 M sodium dodecyl sulfate (SDS), 0.0026 M 1,1′-diphenyl-1,1′-azoethane (DPAE), 0.01 M sensitizer (p-methoxyacetophenone) in distilled water and 1 ml of styrene were placed in a 2 cm. diameter Pyrex tube. As before, this solution was argon purged and irradiated (in the absence of an applied field) for 11 hr. The polymer was precipitated by the addition of reacted solution to 100 ml of stirred methanol solution. The dried polymer (under vacuo at least 24 hr) was analyzed by size exclusion chromatography (SEC) and found to have a molecular weight distribution which had a maximum at $1 \times 10^5$ g.

Experiment in a Field of 5,000 Gauss:

Five ml of the same stock water solution and 1 ml of styrene were placed between the pole faces of an electromagnet. A field of 5,000 Gauss was applied and the solution was irradiated and worked up as above. Analysis of the molecular weight by size exclusion chromatography (SEC) showed a molecular weight distribution which had a maximum at $1.5 \times 10^6$ g.

EXAMPLE III

Emulsion Polymerization of Methylmethacrylate Initiated by Dibenzyl Ketone (DBK)

Experiment in the Absence of an External Magnetic Field:

Five ml of 0.05 M sodium dodecyl sulfate (SDS), 0.001 M dibenzyl ketone (DBK) in distilled water and 2 ml of methylmethacrylate (Aldrich, washed with 10% NaOH and freshly distilled) were placed in a 2 cm. diameter Pyrex tube. As before, this solution was argon purged and irradiated (in the absence of an applied magnetic field) for 3 hr. The sample was worked up as before. The yield of the polymer was found to be 25% and the average molecular weight was found to be $4.6 \times 10^6$ g.

Experiments in Fields of 100 Gauss and 5,000 Gauss:

Five ml of the same stock water solution and 2 ml of methylmethacrylate were placed between the pole faces of an electromagnet. Using fields of 100 Gauss and 5,000 Gauss, two sample solutions were irradiated and worked up as above. The yield of the polymer was found to be approximately 60% and the average molecular weight as found to be approximately $9.5 \times 10^6$ g.

EXAMPLE IV

Polymerization of Acrylic Acid Initiated By 4,4'-di-t-Butyldibenzyl Ketone (DTB).

Experiment in the Absence of an External Magnetic Field:

Five ml of 0.1 M sodium dodecyl sulfate (SDS), 0.0005 M 4,4'-di-tert-butyl-dibenzylketone (DTB) in distilled water and 1 ml of acrylic acid (Aldrich, freshly distilled twice) were placed in a 2 cm. diameter Pyrex tube. The oxygen was removed by bubbling argon through the solution for 30 min. While vigorously stirring mechanically, this sample was irradiated (in the absence of an applied field) with a 200 W mercury lamp, using a Corning 7-54 glass filter and a $K_2CrO_4/Na_2CO_3$ filter solution. After 1 hr of photolysis, 10 ml of 0.1 g p-methoxyphenol in water was added to the reaction solution. This polymer solution was dialyzed for 5 days and was frozen and dried. The dried polymer was 260 mg (approximately 25% yield) and the average molecular weight (as determined by intrinsic viscosity) was $6.5 \times 10^6$ g.

Experiment in a Field of 5,000 Gauss:

Five ml of the same stock water solution and 1 ml of acrylic acid were placed between the pole faces of an electromagnet. A field of 5,000 Gauss was applied and the solution was irradiated and worked up as above. The yield of the dried polymer was 530 mg (approximately 50% yield) and the average molecular weight was $13.1 \times 10^6$ g.

The decreased efficiency of emulsion polymerizations using DTB as an initiator (Example IV) as compared to using DBK as an initiator is believed to be due to the fact that the more hydrophobic 4-tert-butylbenzyl radicals cannot escape from micelles as efficiently as benzyl radicals. Furthermore, there are apprently no magnetic field effects on emulsion polymerizations employing water-soluble initiators (SP and KGA), or with oil-soluble initiators that thermolyze to produce micellized singlet radical pairs, e.g., azobis(isobutyronitrile) and dibenzoyl peroxide. This indicates that emulsion polymerization involving an initiator which produces triplet radical pairs in an environment of restricted dimensionality, such as in a micelle, can be controlled by employing weak magnetic fields.

The above examples show that emulsion polymerizations employing oil-soluble initiators can proceed to high conversions at convenient rates and can produce a polymer having a molecular weight comparable to that achievable in conventional emulsion polymerizations employing water-soluble initiators, and that weak magnetic fields significantly influence emulsion polymerizations which employ oil-soluble initiators. The magnetic field effects appear to operate primarily during the early (micellar) stage of polymerization and to originate from the inhibition of triplet radical coupling within micelles, which leads to the formation of a larger amount of growing polymer particles and to a higher molecular weight and polymerization rate.

In addition to being able to control the molecular weight and the polymerization rate of the total volume of an emulsion polymerization by using weak magnetic fields, the invention enables both molecular weight and polymerization rate to be controlled spatially (within the polymerization volume) by employing a magnetic field which varies spatially in a desired manner. The ability provided by the invention to control spatially an emulsion polymerization has vast practical applications. For example, it is possible to create "images" by using "negatives" which vary the magnetic field strength spatially in a predetermined manner, resulting in a polymer having a molecular weight which varies spatially in the same manner as the applied field. In photoinduced emulsion polymerizations, the same effect can be achieved by employing a spatially uniform magnetic field and means, such as a photographic negative, which blocks light or varies its intensity spatially in a predetermined manner. Such techniques may be useful, for example, for generating three-dimensional images, and could also be attractive alternatives to holography. The invention also has applicability to the manufacture of electrical devices, such as integrated circuits.

Additional details of the theory and practice of the invention are available in a paper by Nicholas J. Turro, Ming-Fea Chow, Chao-Jen Chung and Chen-Ho Tung published in the *Journal of the American Chemical Society*, Volume 102, pp. 7391-7393, November, 1980. This paper and the references referred to therein are incorporated by reference herein.

While several embodiments of the invention have been described, it will be apparent to those skilled in the art that changes can be made in these embodiments without departing from the principles and spirit of the invention, the scope of which is defined in the appended claims.

I claim:

1. A method of controlling an emulsion polymerization reaction comprising employing as an initiator for the reaction an oil-soluble photoinitiator which produces triplet radical pairs, irradiating the photoinitiator to produce such triplet radical pairs, providing for the photoinitiator a plurality of loci of polymerization initiation having the restricted dimensionality of microscopic reaction vessels, and applying a magnetic field having a strength of at least about 100 Gauss and sufficient to afford significant enhancement of polymerization initiation.

2. The method of claim 1, wherein said microscopic reaction vessels are provided by a micelle-forming surfactant solution.

3. The method of claim 1, wherein the photoinitiator is selected from the group consisting of benzyl ketone, benzoin, 1,1'-azoethane, and 4,4'-di-t-butyldibenzyl ketone.

4. The method of claim 3, wherein the emulsion polymerization is one of styrene, methylmethacrylate, and acrylic acid.

5. The method of claim 1, comprising adjusting the strength of the magnetic field to control the molecular weight and the rate of formation of a polymer produced by said reaction.

6. The method of claim 1, wherein said applying comprises applying a magnetic field of 5,000 Gauss or less.

7. The method of claim 6, wherein the magnetic field is in the range of 100–1,000 Gauss.

8. The method of claim 1, wherein the magnetic field is applied with a spatially varying field strength.

9. The method of claim 1, wherein said irradiating comprises irradiating with light which varies spatially in a predetermined manner.

* * * * *